(12) United States Patent
Jenne

(10) Patent No.: US 9,075,595 B2
(45) Date of Patent: Jul. 7, 2015

(54) POWER EXCURSION WARNING SYSTEM

(75) Inventor: John E. Jenne, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 391 days.

(21) Appl. No.: 13/599,593

(22) Filed: Aug. 30, 2012

(65) Prior Publication Data
US 2014/0068311 A1  Mar. 6, 2014

(51) Int. Cl.
*G06F 1/28* (2006.01)
*G06F 1/32* (2006.01)
*G06F 1/26* (2006.01)

(52) U.S. Cl.
CPC ............... *G06F 1/28* (2013.01); *G06F 1/3206* (2013.01); *G06F 1/26* (2013.01)

(58) Field of Classification Search
CPC .......... G06F 1/3206; G06F 1/26; G06F 1/324
USPC ........................................................ 713/340
See application file for complete search history.

(56) References Cited

U.S. PATENT DOCUMENTS

| 2004/0181698 | A1* | 9/2004 | Williams ...................... 713/300 |
| 2009/0066303 | A1* | 3/2009 | Smith et al. ................... 323/274 |
| 2011/0320796 | A1* | 12/2011 | DeCusatis et al. ................ 713/2 |
| 2012/0072739 | A1* | 3/2012 | Isaacson et al. .............. 713/300 |

* cited by examiner

*Primary Examiner* — Jaweed A Abbaszadeh
*Assistant Examiner* — Alyaa T Mazyad
(74) *Attorney, Agent, or Firm* — Haynes and Boone, LLP

(57) ABSTRACT

A power excursion warning system includes a power system having a first slew rate. A powered component is coupled to the power system. The powered component voltage regulator has a second slew rate that is greater than the first slew rate. A powered component voltage regulator is coupled to the powered component and operable to convert a first voltage received from the power system to a second voltage that is supplied to the powered component. A power excursion warning device is coupled to the powered component voltage regulator and operable to receive a signal from the powered component voltage regulator that is associated with the second slew rate, determine that the signal indicates a power excursion that will result in the power system operating outside a predetermined range, and produce a warning signal indicative of the power excursion.

18 Claims, 6 Drawing Sheets

POWER EXCURSION WARNING SYSTEM

BACKGROUND

The present disclosure relates generally to information handling systems, and more particularly to a warning system for power excursions in an information handling system.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

As IHS performance continues to increase, processor manufacturers are pushing processors to higher power limits. For example, Intel® provides processor features such as "Turbo Boost" that allow the processor to operate at higher than the rated frequency (a.k.a, "over clock") as long as power and thermal envelopes are maintained. In some cases, power envelopes have been redefined to allow for excursions above the traditional Thermal Design Power (TDP) of the processor. For example, Intel® has defined a dynamic power ($P_{dyn}$) that allows the processor to draw power that is up to 120% of TDP for a period of seconds. In processors with multiple cores, processors that transition between low and high power instructions, and processors implementing other processor features known in the art, excursions above $P_{dyn}$ may occur up to maximum power ($P_{max}$).

The magnitude and the duration of power excursions by processors above $P_{dyn}$ are becoming significant enough to reach the Power Supply Unit (PSU), as $P_{max}$ for processors is expected to approach and possibly even exceed twice the TDP of the processor, with power excursions up to $P_{max}$ having durations of milliseconds. Conventionally, the power system provided for IHSs including such processors must then be budgeted for $P_{max}$ in order to ensure that the PSU load does not exceed the PSU capacity, as exceeding PSU capacity can result in PSU shutdown and the accompanying possibility of IHS data loss. The need to budget for $P_{max}$ to accommodate these power excursions results in larger and costlier PSUs, which are sometimes not an option in dense IHS designs or IHSs that require redundant PSUs.

Accordingly, it would be desirable to provide an improved power system for an IHS.

SUMMARY

According to one embodiment, a power excursion warning system includes a power system having a first slew rate; a powered component coupled to the power system, wherein the powered component has a second slew rate that is greater than the first slew rate; a powered component voltage regulator coupled to the powered component and operable to convert a first voltage received from the power system to a second voltage that is supplied to the powered component; and a power excursion warning device coupled to the powered component voltage regulator and operable to receive a power signal from the powered component voltage regulator that is associated with the second slew rate, determine that the power signal indicates a power excursion that will result in the power system operating outside a predetermined range, and produce a warning signal indicative of the power excursion.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
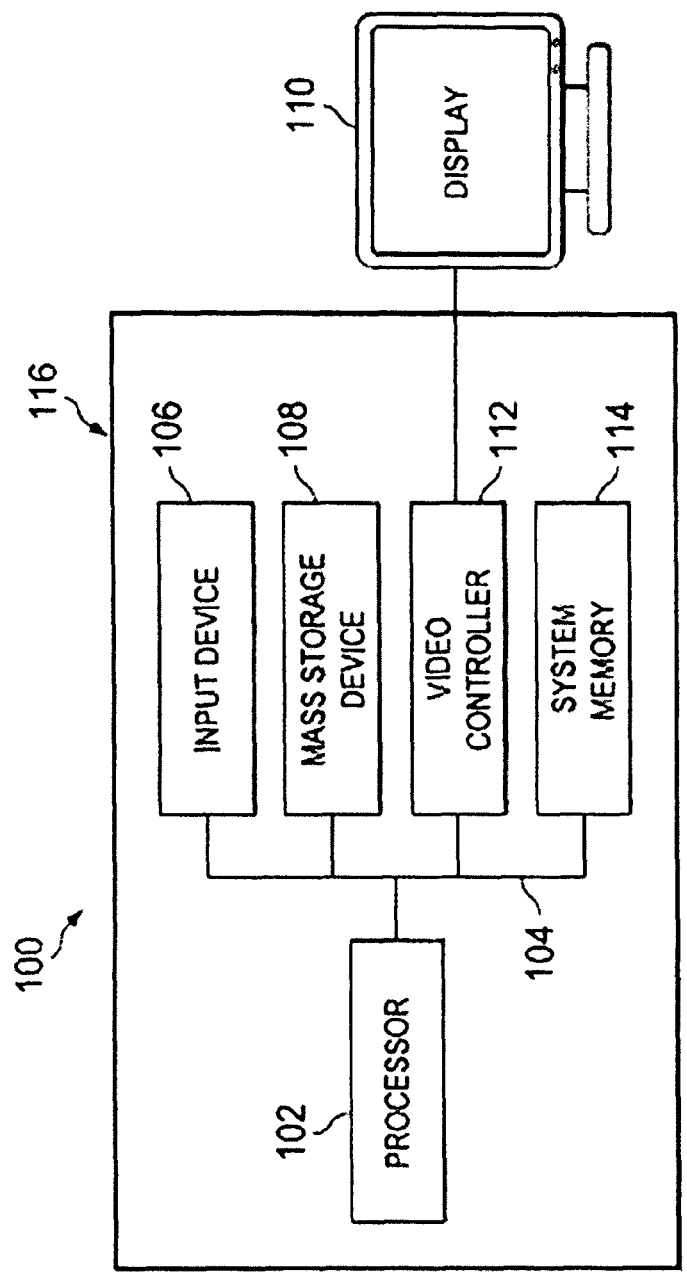
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
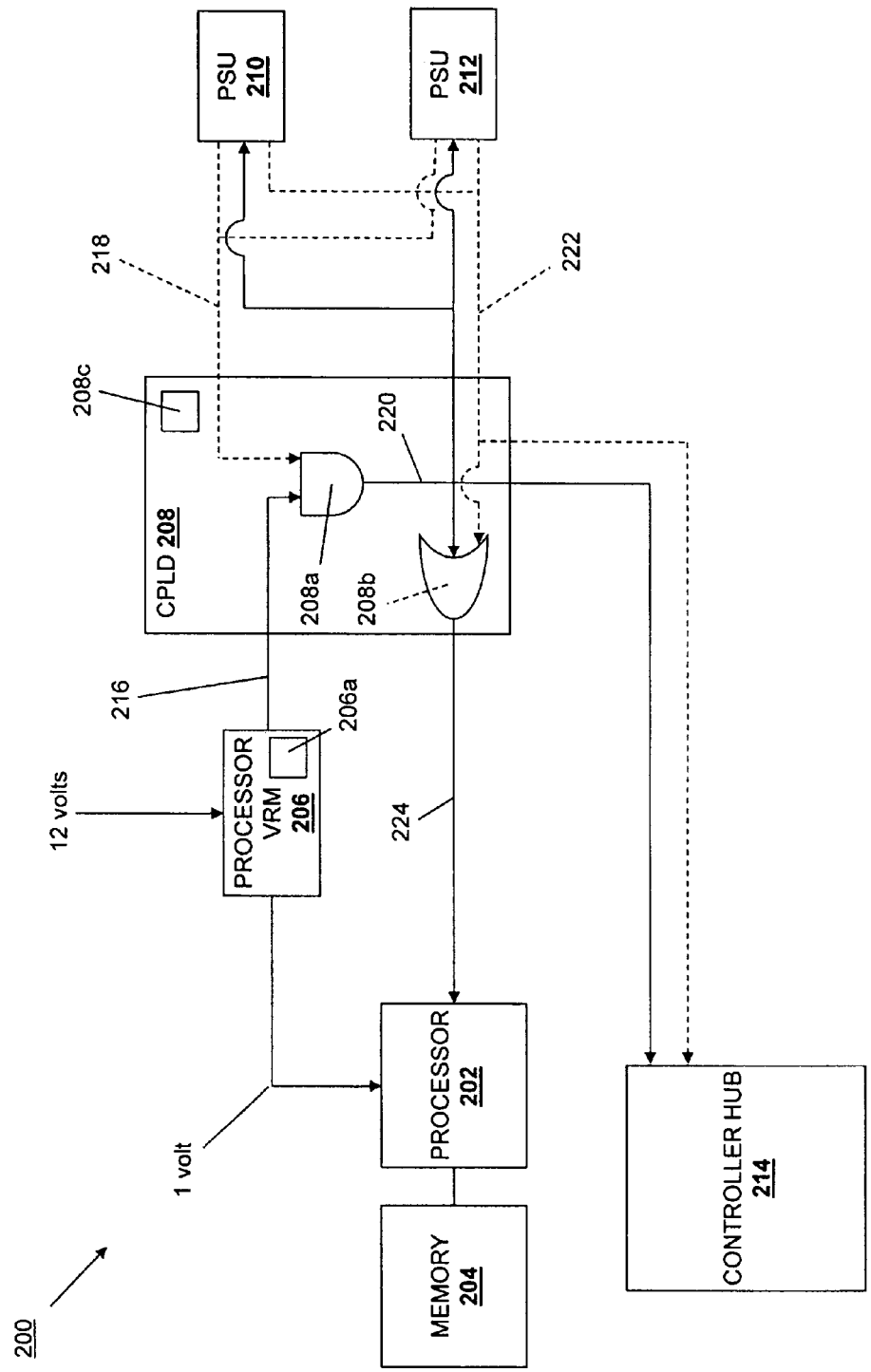
FIG. 2 is a schematic view illustrating an embodiment of a power excursion warning system.

Referring now to FIG. 2, an embodiment of a power excursion system 200 is illustrated. As discussed in further detail below, the power excursion system 200 may be implemented in or with a variety of IHS's known in the art. For example, the power excursion system 200 may be implemented as part of the IHS 100, discussed above with reference to FIG. 1, which may include a server IHS, a desktop IHS, a laptop IHS, a tablet IHS, a mobile phone IHS, and/or a variety of similar IHSs known in the art. In another example, the power excursion system 200 may be implemented as a modular IHS such as, for example, a blade server. As such, in some embodiments, all of the elements in the power excursion system 200 may be housed in an IHS chassis (e.g., the chassis 116 discussed above with reference to FIG. 1), while in other embodiments, elements of the power excursion system 200 may be coupled to the IHS (e.g., a plurality of modular IHSs may be coupled to the power system that, in the illustrated embodiment includes the PSUs, discussed in further detail below.) Thus, a wide variety of modification to the specific embodiments discussed below is envisioned as falling within the scope of the present disclosure, including but not limited to distribution of the components across one or more IHSs.

The power excursion warning system 200 includes a first powered component that, in the illustrated embodiment, includes a processor 202, which may be the processor 102 discussed above with reference to FIG. 1. The processor 202 is coupled to a second powered component that, in the illustrated embodiment, includes a memory 204, which may be the system memory 114 discussed above with reference to FIG. 1 and may include a plurality of memory devices. While only two powered components are illustrated in the embodiment of FIG. 2, one of skill in the art will recognize that the power excursion system 200 and/or IHS with which the power excursion system is implemented may include any number of powered components while remaining within the scope of the present disclosure.

A first powered component voltage regulator module that, in the illustrated embodiment, includes a processor voltage regulator module 206 is coupled to the processor 202 and a power excursion warning device 208. The first powered component voltage regulator module is operable to receive a first voltage from the power system, discussed in further detail below, convert the first voltage to a second voltage, and provide the second voltage to the first powered component. Furthermore, the first powered component voltage regulator module is operable to receive, retrieve, or otherwise determine the required supply voltage from the first powered component and act as a continuously variable and adjustable voltage regulator. In an embodiment, the first powered component voltage regulator module only supplies voltage to the first powered component or only supplies voltages to similar first powered components. For example, in the illustrated embodiment, the processor voltage regulator module 206 receives approximately 12 volt power from the power system (e.g., a power system voltage regulator), converts that approximately 12 volt power to approximately 1 volt power, and supplies that approximately 1 volt power to the processor 202 (or to a plurality of processors.) In an embodiment, the first powered component voltage regulator module may include a storage 206a that may be coupled to a variety of interfaces such as, for example, the System V Interface Definition (SVID), the Power Management (PM) Bus, and/or a variety of other interfaces known in the art that are operable to allow the storage 206a to be accessed such that a threshold may be programmed and accessed using, for example, a Basic Input/Output System (BIOS), a Baseboard Management Controller (BMC), and/or a variety of other system software known in the art.

In the illustrated embodiment, the power excursion warning device 208 includes a complex programmable logic device (CPLD) that is coupled to the power system that includes a pair of power supply units (PSUs) 210 and 212. In one example, the PSU 210 may be a primary PSU while the PSU 212 may be a redundant PSU. However, a variety of other power system components and configurations are envisioned as falling within the scope of the present disclosure. The power excursion warning device 208 is also coupled to a controller hub 214 which may be, for example, a platform controller hub (PCH) that operates to perform traditional Southbridge processor operations. The power excursion warning device 208 is also coupled to the processor 202 (e.g., to the PROCHOT# pin on an Intel® processor.) In an embodiment, the power excursion warning device 208 may include a programmable register 208c.

As discussed in further detail below, in the illustrated embodiment, the processor voltage regulator module 206 is operable to provide a processor voltage regulator module signal 216 (e.g., a power signal such as an output current) to an AND gate 208a in the power excursion warning device 208. Each of the PSUs 210 and 212 are operable to provide a first PSU signal 218 (e.g., a power system output signal such as a PSU output current warning signal that may be used to qualify a voltage regulator over current warning, discussed in further detail below) to the AND gate 208a in the power excursion warning device 208. The AND gate 208a (e.g., along with other components in the power excursion warning device 208) is operable to output a warning signal 220 to each of an OR gate 208b, the controller hub 214, and each of the PSUs 210 and 212. Each of the PSUs 210 and 212 are further operable to provide a second PSU signal 222 (e.g., an alert signal such as an System Management Bus (SMB) Alert signal (e.g., "SMBAlert#") that may correspond to a PSU output current warning signal that is more critical than the PSU signal 218 and can initiate component throttling without further qualification, as discussed in further detail below) to each of the OR gate 208b and the controller hub 214. The OR gate 208b is coupled to the processor 202 and operable (e.g., along with other components in the power excursion warning device 208) to output a throttling signal 224 to the processor 202.

Figure 3:
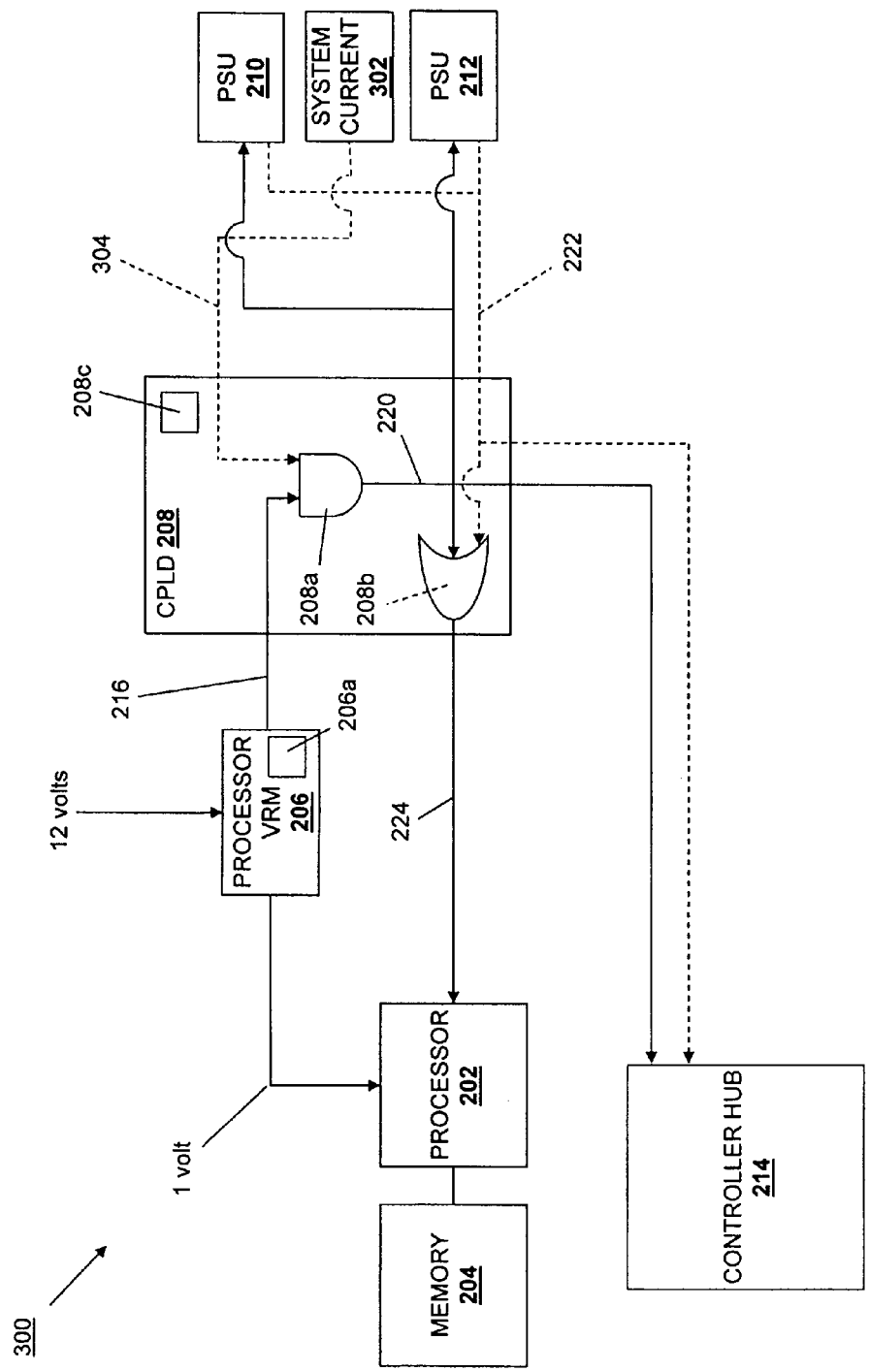
FIG. 3 is a schematic view illustrating an embodiment of a power excursion warning system.

Referring now to FIG. 3, a power excursion warning system 300 is illustrated that is substantially similar to the power excursion warning system 200 discussed above with reference to FIG. 2, but with the provision of a system level current monitor 302 and modified operation of the PSUs 210 and 212. The PSUs 210 and 212 in the power excursion system 300 do not provide the first PSU signal 218 (e.g., a lower level overcurrent warning signal as discussed above) to the AND gate 208a in the power excursion warning device 208 of the power excursion warning system 300. Rather, in the power excursion warning system 300, the system current monitor 302 is operable to provide a system level current monitor signal 304 (e.g., a power system output signal such as a power system output current warning signal) that replaces the first PSU signal 218 provided by each of the PSUs 210 and 212. In an embodiment, the system level current monitor is operable to monitor the power draw of an entire IHS such as, for example, the IHS 100 discussed above with respect to FIG. 1, and provide the system level current monitor signal 304 that is indicative of that power draw.

The power excursion warning system 300 illustrates an embodiment of a situation where the PSUs 210 and 212, or other power system components, do not support multiple output signals. For example, the PSUs 210 and 212 may provide for only one output signal, which may be utilized for the second PSU signal 222/alert signal, with the system level current monitor 302 included to provide the power system output current. While a few examples of power excursion warning system architecture have been provided in FIGS. 2 and 3, will recognize that a wide variety of combination and modification to the exemplary embodiments will fall within the scope of the present disclosure. For example, any plurality of PSUs may be provided in the power system to power one or more IHSs or IHS components, such as occurs when a plurality of blade servers are coupled to a power system. In such a system, each of the blade servers may include a system level current monitor similar to that illustrated in FIG. 3.

The power excursion systems and methods of the present disclosure utilize the faster slew rate associated with powered component to trigger power excursion warnings well before such a warning would traditionally be triggered using the slower slew rate associated with the power system. For example, in the embodiments illustrated in FIGS. 2 and 3, the processor 202 includes a first slew rate that is higher than a second slew rate of the PSUs 210 and 212 and/or the system level current monitor 302. By using a voltage regulator with a fast current detect that monitors the voltage rail used by a powered component (e.g., the 1 volt power rail) with a higher slew rate than the power system to provide a warning of an impending power excursion, actions may be taken (e.g., component throttling actions, power system actions, and/or a variety of other actions known in the art) to ensure that the power system is not overloaded during the power excursion. Such a system provides substantial benefits over the traditional monitoring of the voltage rail for the power system (e.g., the 12 volt power rail) with the slower slew rate.

Figure 4:
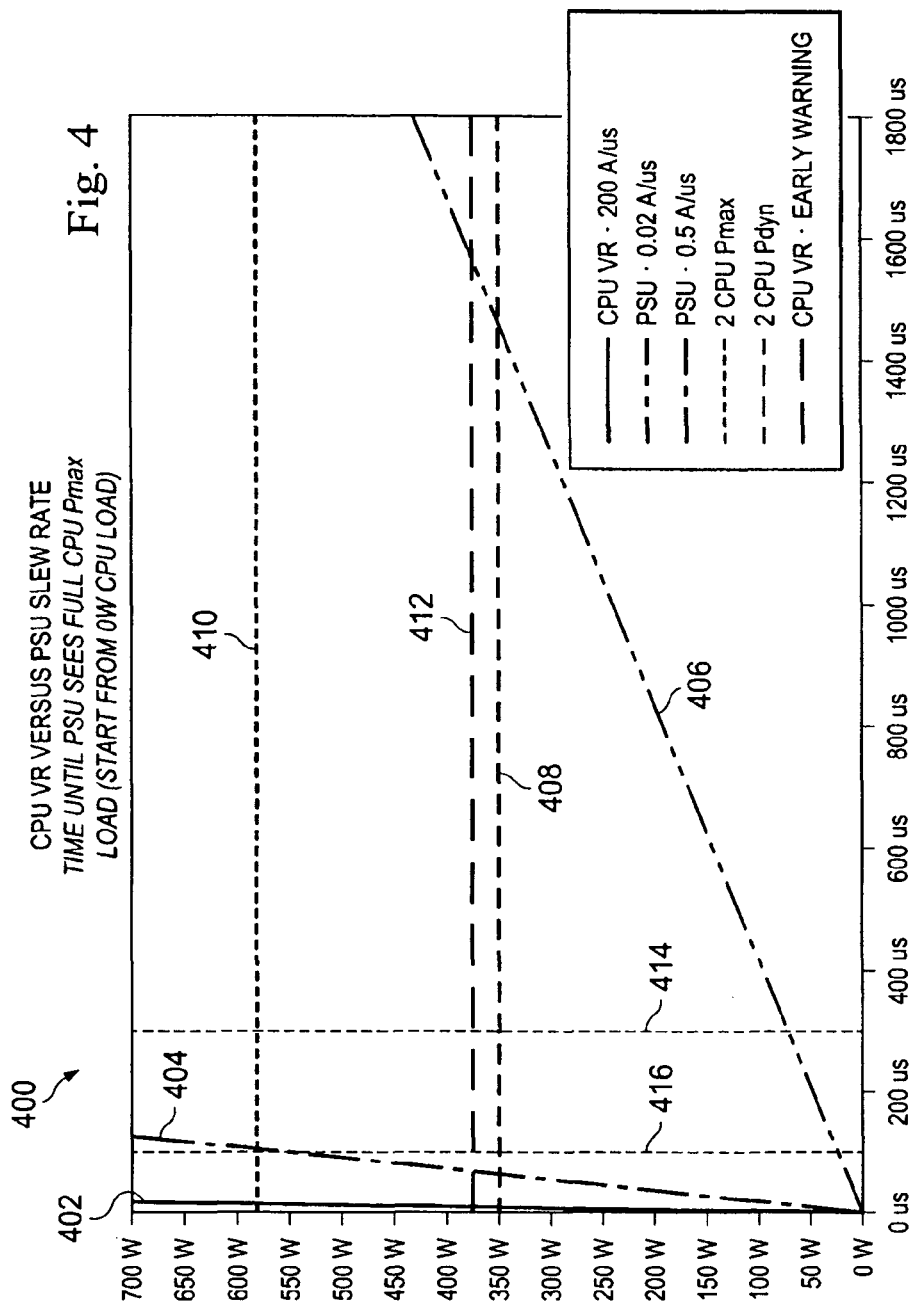
FIG. 4 is a graph illustrating an embodiment of processor and power supply unit slew rates.
Figure 5:
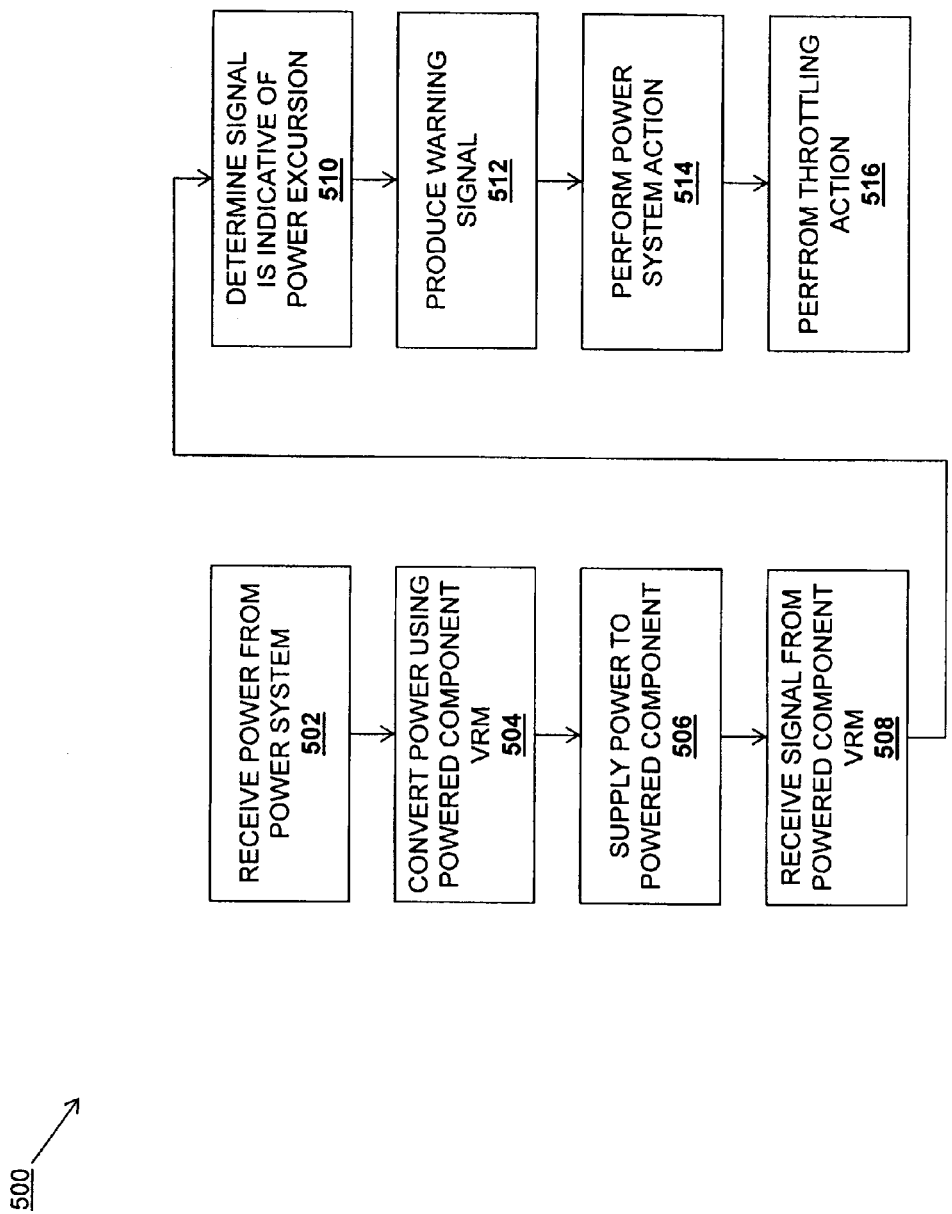
FIG. 5 is a flow chart illustrating an embodiment of a method for powering an HIS.

FIG. 4 illustrates a graph 400 that includes an embodiment of processor and PSU slew rates to provide an example of some of the benefits provided by the systems and methods of the present disclosure, with power on the y-axis and time on the x-axis. Current processors such as, for example, CPU's according to Intel's® VR12 specification for SandyBridge CPU's, exhibit a maximum slew rate of 200 A/μs, with next generation CPU's expected to approach slew rates of 400-1000 A/μs. FIG. 4 includes a processor slew rate 402 of 200 A/μs, which with the scale of the graph 400 coincides with the y-axis. Furthermore, Intel's® VR12 specification for SandyBridge CPU's recommends a maximum input current slew rate (e.g, the slew rate of the input current of the power system) to be 0.5 A/μs. FIG. 4 includes a PSU maximum slew rate 404 of 0.5 A/μs. However, experimental embodiments have found that implemented power systems exhibit a slew rate closer to 0.02 A/μs. FIG. 4 includes a PSU actual slew rate 406 of 0.02 A/μs. Thus, as can be seen from the graph 400, it has been found that the processor slew rate 402 is higher than the PSU maximum slew rate 404, and much higher than the PSU actual slew rate 406 (an order of magnitude and more.)

FIG. 4 also illustrates power levels for a two processor system, including a power level 408 of approximately 350 watts for a two CPU system at dynamic power ($P_{dyn}$), which allows the processors to draw power up to 120% of the Thermal Design Power (TDP) of the processors for a period of 65 seconds. FIG. 4 also includes a power level 410 of approximately 580 watts for the two CPU system at maximum power ($P_{max}$). Power level 412 is a proposed warning threshold, discussed in further detail below, that has been set at 375 watts, although a variety of other warning thresholds will fall within the scope of the present disclosure. As can be seen from the graph 400, in the two processor system illustrated in FIG. 4, the processor slew rate 402 reaches the early warning threshold at power level 412 approximately 100 μs before the PSU maximum slew rate 404 and 1500 μs before the PSU actual slew rate 406.

FIG. 4 also illustrates projected reaction times processors after receiving a signal (e.g., at a processor PROCHOT# pin), including an expected reaction time 414 for of approximately 300 μs for current processors and an expected reaction time 416 for next generation processors approaching 100 μs. The reaction times 414 and 416 illustrate that, in order for a processor to react to a warning signal in time to help prevent a load from reaching the power system, processor operations that produce loads must be detected, and an interrupt asserted, very quickly. Detection time ranges are dependent on the starting processor load, number of processors, board capacitance, and other factors known in the art, causing conventional IHSs incorporating over current warning detection logic to take up to 50 ms to detect and assert an interrupt, with system level current monitors on the order of 250 μs. However, processor voltage regulator modules incorporate fast current detection logic to support features such as autonomous phase shedding, and are expected to be operable to detect and assert a warning signal in less than 1 μs. Thus, the systems and methods of the present disclosure that utilize a processor voltage regulator module to provide a warning signal for power excursions have a considerable time advantage when considering both the latency of detection and the slew rates in conventional systems.

Referring now to FIGS. 2, 3, 5, and 6, a method for powering a system is illustrated. The method 500 begins at block 502 where power is received from a power system. As is known in the art, IHS power systems provide power (e.g., approximately 12 volts of Direct Current (DC) power) to the IHS for use in powering the powered components in the IHS. For example, the PSU 210 and/or the PSU 212 in the power excursion warning systems 200 and/or 300 may receive Alternating Current (AC) power, convert it to DC power, and supply the DC power (e.g., approximately 12 volts) to the processor voltage regulator module, a voltage regulator module for the memory, and/or to other powered component systems used in the IHS (e.g., the IHS 100 discussed above with reference to FIG. 1.) However, the present disclosure is not limited to AC-input PSU's, and may be applied to DC-input PSUs such as, for example, −48 volt DC systems, 240 volt DC systems, 380 volt DC systems, and/or a variety of other power systems known in the art.

The method 500 then proceeds to blocks 504 and 506 where power is converted using a powered component voltage regulator module and supplied to a powered component. For example, the processor voltage regulator module 206 in the power excursion warning systems 200 and/or 300 may receive the approximately 12 volt power from the PSU 210 and/or the PSU 212, convert that approximately 12 volt power to a required supply voltage for the processor 202, and supply the required supply voltage to the processor 202. While the systems and methods illustrated and described herein focus on the processor 202 and the processor voltage regulator module 206 as the first powered component and first powered component voltage regulator module, one of skill in the art will recognize that the memory 204 and a memory voltage regulator module (not illustrated) may be provided as the first powered component and the first powered component voltage regulator module, as well as any other powered component/ powered component voltage regulator module (e.g., graphics processor systems, storage systems (hard disk drives, solid state drives, PCIe solid state drives, and/or other storage technologies), and/or variety of other powered components systems having a sufficiently high slew rate relative to the power system slew rate (e.g., an order of magnitude greater), as discussed herein.

Figure 6:
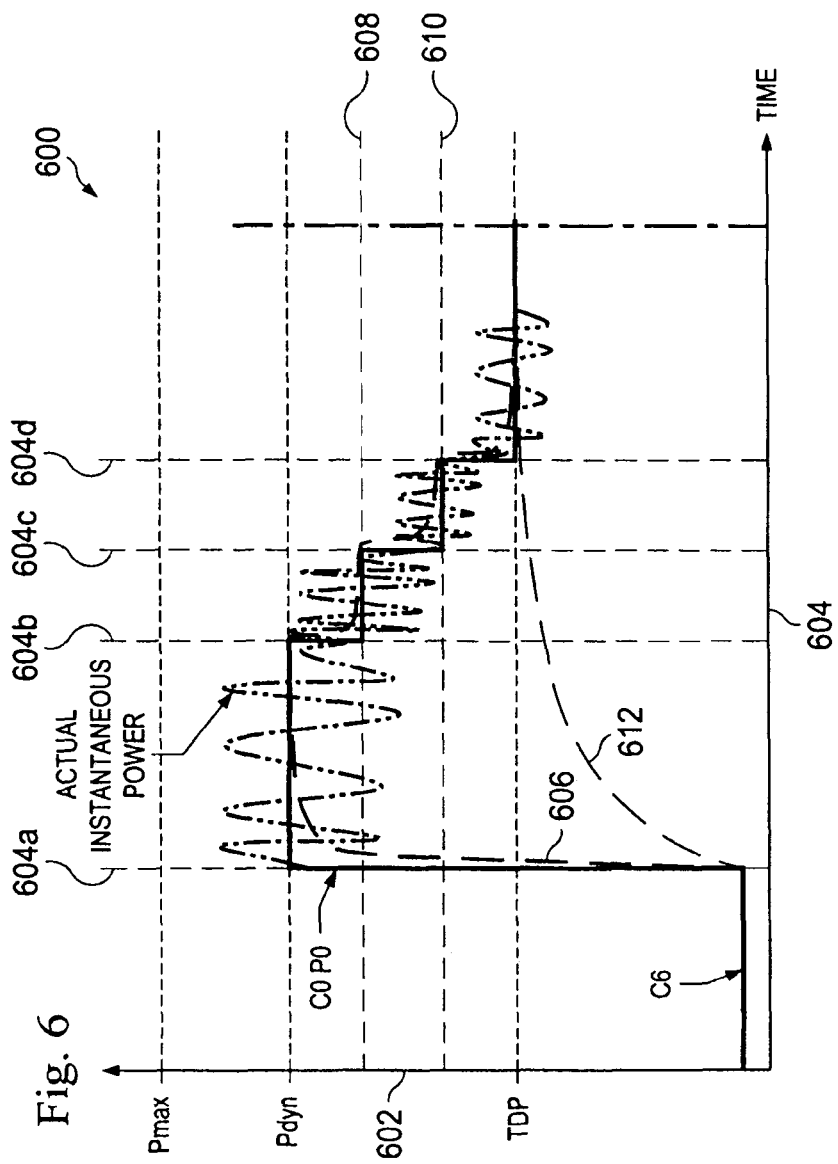
FIG. 6 is a graph illustrating an embodiment of processor power draw vs. time.

FIG. 6 is a graph illustrating an embodiment of a processor power demand curve 600 that plots processor power demand 602 vs. time 604 and provides an example of a required supply voltage of the processor 202 seen by the processor voltage regulator 206. The curve 600 in FIG. 6 illustrates the transition of the processor (e.g., the processor 202) from a C6 power state (a.k.a., "sleep state") to a C0 power state (a.k.a., "operating state") and a P0 performance state (a.k.a, "max power and frequency"). One of skill in the art will recognize that the processor may operate in a variety of states other than those illustrated in FIG. 6, and/or transition between a variety of states not illustrated in FIG. 6 without departing from the scope of the present disclosure. As can be seen in FIG. 6, the transition from the C6 power state to the C0 power state/P0 performance state at time 604a results in a processor power demand that exceeds the TDP of the processor and reaches $P_{dyn}$, discussed above. Between times 604a and 604b, the actual instantaneous power required by the processor fluctuates above and below $P_{dyn}$, causing a transient average power 606 required by the processor to approach $P_{dyn}$. While the embodiment illustrated in FIG. 6 does not include the actual instantaneous power required by the processor reaching $P_{max}$, as discussed above, such a situation may occur during the operation of the processor.

The method 500 then proceeds to block 508 where a signal is received from the powered component voltage regulator module. For example, the processor voltage regulator module 206 in the power excursion warning systems 200 and/or 300 may send the processor voltage regulator module signal 216 to the power excursion warning device 208. In an embodiment, the processor voltage regulator module signal 216 includes a power signal such as an output current of the processor voltage regulator module 206 and/or a signal indicative of the level of output current of the processor voltage regulator module 206. Referring to FIG. 6, the processor voltage regulator module 206 may send the processor voltage regulator module signal 216 to the power excursion warning device 208 when the actual instantaneous power required by the processor exceeds $P_{dyn}$, discussed below.

As discussed above, the processor voltage regulator module 206 may include a storage 206a that may be programmed with a threshold via interfaces such as an SVID interface, a PMBus interface, and/or a variety of other interfaces known in the art, and that threshold accessed via the BIOS, the BMC, and/or other control systems within the IHS. In an embodiment, the threshold may be a power threshold such as, for example, a current threshold. For example, the power threshold may be $P_{dyn}$, discussed above, plus some margin power amount, such as the proposed warning threshold at power level 412 illustrated in FIG. 4, which is the power level 408 for $P_{dyn}$ of 350 watts plus a margin of 25 watts. The margin amount may be chosen to prevent asserting a warning signal, discussed below, too often. At block 508, the processor voltage regulator module 206 may determine that the processor 202 requires a supply voltage above the power threshold (or current threshold) programmed in the storage 206a and, in response, may provide the processor voltage regulator module signal 216 to the power excursion warning device 208. Depending on the sampling rate of the processor voltage regulator module 206, averaging and/or filtering techniques may be employed on the required supply voltage for the processor 202 in determining when to provide the processor voltage regulator module signal 216 to the power excursion warning device 208.

The method 500 then proceeds to block 510 where it is determined that the signal from the powered component voltage regulator module is indicative of a power excursion that will result in the power system operating outside a predetermined range. In one embodiment, any powered component voltage regulator module signal sent in response to a required power of its powered component exceeding a threshold may be indicative of a power excursion that will result in the power system operating outside a predetermined range. However, in some embodiments, the power system may be capable of handling power excursions such as, for example, when the power system is operating well below its maximum level. In such situations, the first PSU signal 218 from the PSU 210 and/or the PSU 212, illustrated in FIG. 2, or the system level current monitor signal 304, illustrated in FIG. 3, may be used by the power excursion warning device 208 to determine whether the signal from the powered component voltage regulator module is indicative of a power excursion that will result in the power system operating outside a predetermined range.

In the embodiment illustrated in FIG. 2, the AND gate 208a is operable to receive the processor voltage regulator module signal 216 and the first PSU signal 218 from the PSU 210 and/or the PSU 212. As discussed above, the processor voltage regulator module signal 216 may only be sent to the power excursion warning device 208 (and thus, the AND gate 208a) in response to the required supply voltage for the processor 202 exceeding a predetermined threshold. Likewise the first PSU signal 218 may only be sent to the power excursion warning device 208 (and thus, the AND gate 208a) in response to the PSU 210 and/or 212 operating above a predetermined threshold. Thus, unless the AND gate 208a receives both the processor voltage regulator module signal 216 and the first PSU signal 218, the power excursion warning device 208 may determine that the processor voltage regulator module signal 216 is not indicative of a power excursion that will result in the power system operating outside a predetermined range. In other words, the processor voltage regulator module 206 may send a processor voltage regulator module signal 216 to the power excursion warning device 208, but if no first PSU signal 218 is received at the same time or within a predetermined time period, the power excursion warning device 208 may determine that the PSU 210 and/or 212 is capable of handling the power excursion.

Similarly, in the embodiment illustrated in FIG. 3, the AND gate 208a is operable to receive the processor voltage regulator module signal 216 and the system level current monitor signal 304 from the system level current monitor 302. As discussed above, the processor voltage regulator module signal 216 may only be sent to the power excursion warning device 208 (and thus, the AND gate 208a) in response to the required supply voltage for the processor 202 exceeding a predetermined threshold. Likewise the system level current monitor signal 304 may only be sent to the power excursion warning device 208 (and thus, the AND gate 208a) in response to system level current monitor 302 detecting that the operation of the system is drawing power that is above a predetermined threshold. Thus, unless the AND gate 208a receives both the processor voltage regulator module signal 216 and the system level current monitor signal 304, the power excursion warning device 208 may determine that the processor voltage regulator module signal 216 is not indicative of a power excursion that will result in the power system operating outside a predetermined range. In other words, the processor voltage regulator module 206 may send a processor voltage regulator module signal 216 to the power excursion warning device 208, but if no system level current monitor signal 304 is received at the same time or within a predetermined time period, the power excursion warning device 208 may determine that the PSU 210 and/or 212 is capable of handling the power excursion.

In the embodiments utilizing the first PSU signal 218 or the system level current monitor signal 304 above, the PSUs 210 and/or 212 or the system level current monitor 302 may support a programmable threshold at which those signals are sent to the power excursion warning device 208 as discussed above. For example, some PSUs may support a programmable over-current warning that maps the PSUs SMBAlert# signal, and to use the warning for the first PSU signal 218, a dedicated non-latching over-current warning may be created. Thus, in some embodiments, a PSU may be provided that supports two over-current warnings: a first over-current warning to generate system throttling via SMBAlert# due to a PSU output limit (e.g., a greater than 100% PSU output), and a second over-current warning that is less than the PSU output limit and that is used to determine whether the PSU can handle a power excursion. In an embodiment, these thresholds may be configured in the system via the PMBus.

Furthermore, the power excursion warning device 208 in either of the power excursion warning systems 200 and/or 300 may include the programmable register 208c that may be programmed with a predetermined number related to the processor voltage regulator module signals 216, the first PSU signal 218, the system level current monitor signals 304, and/or combinations thereof, and the programmable register 208c may be used to track the number of times the power excursion-related signals discussed above have been received by the power excursion warning device 208 such that a warning signal, discussed below, is not provided unless the predetermined number of power excursion-related signals is received. Other logic may be provided in the system to qualify over current warnings and avoid false system responses such as, for example, requiring multiple processor subsystem over current warnings to assert a system level response, providing a PSU hardware indicator of the PSU load level, providing a system current monitor indicator of the system load level, and/or a variety of other qualifiers known in the art.

The method 500 then proceeds to block 512 where a warning signal is produced. As discussed above, the first powered component voltage regulator signal received from the first powered component voltage regulator may be determined to be indicative of a power excursion that will result in the power system operating outside a predetermined range. In response to that determination, the power excursion warning device 208 produces a warning signal 220. For example, the AND gate 208a may produce the warning signal in response to receiving both the processor voltage regulator module signal 216 and the first PSU signal 218 in the power excursion warning system 200 of FIG. 2. In another example, the AND gate 208a may produce the warning signal in response to receiving both the processor voltage regulator module signal 216 and the system level current monitor signal 304 in the power excursion warning system 300 of FIG. 3.

The method 500 then proceeds to block 514 where a power system action is performed. The power excursion warning system 208 provides the warning signal to the power system and the power system is operable to perform a power system action in response to receiving the warning signal. For example, in the power excursion warning systems 200 and 300, the power excursion warning system 208 provides the warning signal 220 to the PSU 210 and/or the PSU 212. In response to receiving the warning signal 220, the PSU 210 and/or the PSU 212 is operable to perform the power system action such as, for example, increasing a PSU output voltage, entering a constant current mode, and/or performing a variety of other power systems actions that will allow the PSU 210 and/or 212 to ensure a sufficient power is supplied to the system (e.g., to the processor 202, the memory 203, and/or other system components) during the power excursion.

The method 500 then proceeds to block 516 where a throttling action is performed. The power excursion warning system 208 provides the warning signal to the powered component or a powered component controller, and powered component or powered component controller is operable to perform a throttling action on the powered component. For example, in the power excursion warning systems 200 and 300, the power excursion warning system 208 provides the warning signal 220 to the OR gate 208b, which then provides the throttling signal 224 to the processor 202. In an embodiment, the throttling signal 224 may be a hardware interrupt signal provided to the PROCHOT# pin on an Intel® processor to signal to the processor 202 to change its operation such that load on the power system is reduced. As can be seen, the second PSU signal 222 (e.g., a SMBAlert#) may also be provided from the PSU 210 and/or 212 to the OR gate 208b to cause the throttling signal 224 to be asserted (e.g., in the case where the PSU is operating at, or about to operate at, its maximum output level.)

Referring back to FIG. 6, the throttling actions performed on the processor 202 may result in a reduction of the processor power demand. For example, a first throttling action performed on a processor may reduce the power demand and/or performance state of the processor such that the processor operates at a power level 608 between times 604b and 604c, with the actual instantaneous power required by the processor fluctuating between a power level above TDP and below $P_{dyn}$. Furthermore, a second throttling action performed on a processor may reduce the power and/or performance state of the processor such that the processor operates at a power level 610 between times 604c and 604d, with the actual instantaneous power required by the processor fluctuating between a power level above TDP and below the power level 608. Finally, a third throttling action performed on a processor may reduce the power and/or performance state of the processor such that the processor operates at the TDP of the processor subsequent to time 604d, with the actual instantaneous power required by the processor fluctuating above and below TDP. Thus, while the overall average power 612 required by the processor approaches the TDP of the processor, it can be seen that power excursions can result in power spikes well above TDP that can reach the power system.

Furthermore, the warning signal 220 (and the second PSU signal 222) is also provided to the controller hub 214. While not illustrated, the controller hub 214 is operable, in response to receiving the warning signal 220 (or the second PSU signal 222), to modify the operation of other system components. For example, the controller hub 214 may be operable to interrupt system firmware (e.g., an Intel® node manager) to adjust processor power limits (e.g., the CPU Running Average Power Limits (RAPL)), and/or provide for throttling or other power limiting features on any other components (e.g., the memory 204, a fan system, etc.) in the system. Throttling actions performed on the system may include hardware throttling, firmware interrupts (e.g., throttling, warnings), PSU interrupts causing potential PSU responses (e.g., convert to constant current operation, step up output voltage, etc.).

Thus, a power excursion warning system has been described that provides a warning signal, indicative of a power excursion that will result in the power system operating outside a predetermined range, using an input from a powered component voltage regulator module that is associated with a slew rate of the powered component that is higher than the power system. The higher slew rate of the powered component allows the power excursion to be detected much sooner than conventional systems, and makes a warning signal produced based on that higher slew rate more timely in adjusting the system to deal with the power excursion. The power excursion warning system may be used in an IHS to enable the implementation of smaller power systems (relative to conventional systems) that are able to provide sufficient power to the IHS due the ability, disclosed above, to quickly adjust system operation to deal with brief power excursions that have traditionally required larger power systems.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A power excursion warning system, comprising:
a power system having a first slew rate;
a powered component that is coupled to the power system that that has a second slew rate that is greater than the first slew rate;
a powered component voltage regulator coupled to the powered component and operable to convert a first voltage received from the power system to a second voltage that is supplied to the powered component; and
a power excursion warning device coupled to the powered component voltage regulator and operable to receive a power system output signal from the power system, receive a signal from the powered component voltage regulator that is associated with the second slew rate, determine that the signal from the powered component voltage regulator and the power system output signal indicate a power excursion that will result in the power system operating outside a predetermined range, and produce a warning signal indicative of the power excursion.

2. The power excursion system of claim 1, wherein the powered component is a processor and the powered component voltage regulator is a processor voltage regulator that converts a system voltage provided by the power system to a processor voltage and supplies the processor voltage to the processor.

3. The power excursion system of claim 1, wherein the power system includes a power supply unit (PSU) and the power system output signal includes a PSU output current.

4. The power excursion system of claim 1, wherein the power system includes a system level current monitor and the power system output signal includes a current detected by the system level current monitor.

5. The power excursion system of claim 1, wherein the warning signal is provided to the power system, and wherein the power system is operable to perform at least one power system action in response to receiving the warning signal.

6. The power excursion system of claim 1, wherein the warning signal is provided to the powered component, and wherein the powered component is operable to perform at least one throttling action in response to receiving the warning signal.

7. An information handling system (IHS), comprising:
a processor having a processor slew rate;
a memory coupled to the processor;
a processor voltage regulator coupled to the processor and operable to convert a first voltage to a second voltage and supply the second voltage to the processor; and
a power excursion warning device coupled to the processor voltage regulator, wherein the power excursion warning device is operable to receive a power system output signal from a power system having a power system slew rate that is less than the processor slew rate, receive a signal from the processor voltage regulator that is associated with the processor slew rate, determine that the signal from the processor voltage regulator and the power system output signal indicates a power excursion that will result in the power system operating outside a predetermined range, and produce a warning signal indicative of the power excursion.

8. The IHS of claim 7, wherein the processor voltage regulator is operable to receive the first voltage from a system voltage regulator that converts and supplies voltage to the IHS.

9. The IHS of claim 7, wherein the power system includes a power supply unit (PSU) and the power system output signal includes a PSU output current.

10. The IHS of claim 7, wherein the power system includes a system level current monitor and the power system output signal includes a current detected by the system level current monitor.

11. The IHS of claim 7, wherein the warning signal is provided to the power system, and wherein the power system is operable to perform at least one power system action in response to receiving the warning signal.

12. The IHS of claim 7, wherein the warning signal is provided to the processor, and wherein the processor is operable to perform at least one throttling action in response to receiving the warning signal.

13. The IHS of claim 7, wherein the power excursion warning device includes a register for tracking a number of times the power excursion warning device determines that the signal from the processor voltage regulator and the power system output signal indicate a power excursion that will result in the power system operating outside a predetermined range, and wherein the warning signal is produced in response to the number of times reaching a predetermined number.

14. A method for powering a system, comprising:
receiving power from a power system having a first slew rate;
converting the power from a first voltage to a second voltage using a processor voltage regulator;
supplying the second voltage from the processor voltage regulator to a processor having a second slew rate that is greater than the first slew rate;
receiving a power system output signal from the power system;
receiving a signal from the processor voltage regulator that is associated with the second slew rate;
determining that the signal from the processor voltage regulator and the power system output signal indicate a power excursion that will result in the power system operating outside a predetermined range; and
producing a warning signal indicative of the power excursion.

15. The method of claim 14, wherein the power system includes a power supply unit (PSU) and the power system output signal includes a PSU output current.

16. The method of claim 14, wherein the power system includes a system level current monitor and the power system output signal includes a current detected by the system level current monitor.

17. The method of claim 14, wherein the warning signal is provided to the power system and, in response, the power system performs at least one power system action.

18. The method of claim 14, wherein the warning signal is provided to the processor and, in response, the processor performs at least one throttling action.

* * * * *